United States Patent
Baruh

(10) Patent No.: US 7,491,016 B2
(45) Date of Patent: Feb. 17, 2009

(54) PORTABLE DIKE AND FLOATATION DEVICE

(76) Inventor: Bradford G. Baruh, 816 Hayne Rd., Hillsborough, CA (US) 94010

( * ) Notice: Subject to any disclaimer, the term of this patent is extended or adjusted under 35 U.S.C. 154(b) by 41 days.

(21) Appl. No.: 11/323,121

(22) Filed: Dec. 29, 2005

(65) Prior Publication Data

US 2007/0154264 A1   Jul. 5, 2007

(51) Int. Cl.
*E02B 7/20* (2006.01)
(52) U.S. Cl. .................................. 405/114; 405/116
(58) Field of Classification Search ................. 405/114, 405/115, 91, 21, 52, 107
See application file for complete search history.

(56) References Cited

U.S. PATENT DOCUMENTS

| | | |
|---|---|---|
| 3,213,628 A | 10/1965 | Serota |
| 3,834,167 A | 9/1974 | Tabor |
| 4,330,224 A | 5/1982 | Muramatsu et al. |
| 4,555,201 A | 11/1985 | Paoluccio |
| 4,692,060 A | 9/1987 | Jackson, III |
| 4,921,373 A | 5/1990 | Coffey |
| 4,958,956 A | 9/1990 | Tanaka et al. |
| 4,966,491 A | 10/1990 | Sample |
| 4,981,692 A | 1/1991 | Taylor |
| 5,040,919 A | 8/1991 | Hendrix |
| 5,059,065 A | 10/1991 | Doolaege |
| 5,511,902 A | 4/1996 | Center |
| 5,605,416 A | 2/1997 | Roach |
| 5,645,373 A | 7/1997 | Jenkins |
| 6,164,870 A | 12/2000 | Baruh |

FOREIGN PATENT DOCUMENTS

| | | |
|---|---|---|
| JP | 58-69911 | 4/1983 |
| JP | 4-30012 | 2/1992 |

*Primary Examiner*—Tara L. Mayo
(74) *Attorney, Agent, or Firm*—Buchanan Ingersoll & Rooney

(57) ABSTRACT

A portable dike and floatation device having a lower partition including a water inlet and an upper partition attached to the lower partition. The lower partition is water-fillable via the water inlet. The upper partition includes an air inlet for inflating the upper partition. The lower partition forms a triangular prism having a floor and two sides. The upper partition has two lobes, the lobes cover the two sides, the lobes have a triangular prism shape, and wherein the inner and upper partition forms a square prism shape when the lower partition and the upper partition inflate. At least one support member is positioned within the portable dike and floatation device to provide added rigidity to the portable dike and floatation device.

22 Claims, 8 Drawing Sheets

PORTABLE DIKE AND FLOATATION DEVICE

BACKGROUND

An age old flood control tool is the sandbag. Sandbags are typically stacked in layers to divert water to an area where the water will not cause property damage. Even though the bag is porous, the sand filler is dense enough to prevent water flow through the bag. The sand also adds weight so that floodwater will not normally move the sandbag.

One problem with using sandbags is that the bags must be filled, carried and stacked. The sandbags are heavy. Preparing a sandbag dike is labor intensive and possibly backbreaking work. In cases where manpower is limited and flash floods are possible, there may not be enough time to fill, move and stack sandbags to prevent property damage. A portable dike is desired which can be rapidly constructed and positioned with minimum manpower.

U.S. Pat. No. 4,921,373 to Coffey discloses a fluid-filled dike having a frame with a plurality of legs. Fluid, such as water, is often readily available at a flood site. Using the water to fill a container eliminates the need for sand. One drawback, however, of the Coffey invention is that the dike is difficult to assemble. The legs must be assembled, adjusted and affixed to the ground.

U.S. Pat. No. 5,040,919 to Hendrix discloses a water-filled dike partition. The partition has a triangular cross-section. The partition walls include triangular gussets, which are rigid enough to maintain the triangular cross-section. Legs are not needed. A gusseted dike partition, however, may be undesirably bulky to hand carry. Accordingly, possible drawbacks of the Hendrix invention are excessive weight and lack of portability.

U.S. Pat. No. 4,981,392 to Taylor discloses a multi-partition water-filled dike. The partitions are cylindrical shaped and interconnected along a horizontal mid-plane by a sheet of high-strength material. Water fills the cylindrical partitions to maintain the cylindrical partition shape. The partitions are stacked to form a dike. One benefit of the Taylor invention is that the partitions are relatively easy to individually fill. One drawback is that for each partition length, at least two partitions must be filled with water. This takes twice the effort as filling a single partition.

Water and sand take time to fill dike partitions and sandbags, respectively. Accordingly, in U.S. Pat. No. 6,164,870 to Baruh, which is incorporated herein in its entirety, a dike was disclosed which was a quick and more efficient way of providing a portable dike, which is also is lightweight. It would be desirable for the portable dike not only to serve as a portable dike, however, it extreme cases, it would be desirable for the portable dike to be converted into a floatation device.

SUMMARY

The dike of the present invention includes interconnected inflatable portable dike and floatation devices. Each portable dike and floatation device includes an upper and lower partition. Each partition includes an inlet for inflating the partition. The lower partition is water fillable and normally holds water to weight the portable dike and floatation device. The upper partition is air fillable and normally holds air to shape and support the lower partition. In addition, each of the portable dike and floatation devices include at least one support member, which is dimensioned to be received within the portable dike and floatation device to provide added shape not only when the device is acting as a water diversion device but also as a floatation device.

The portable dike and floatation device is portable and compresses and folds for easy transport. To set up the portable dike and floatation device, each section pre-inflates. Handles are provided on each section and attach to the upper partition. Lifting the handles lifts the upper partition and pre-inflates both the upper partition and the lower partition with air. Pre-inflation pre-shapes the partitions.

Water fills at least a portion of the lower partition. It can be appreciated that filling the lower partition with water increases the air pressure within the lower partition. This increased air pressure helps to shape the lower partition.

The lower partition has vents in fluid communication with the upper partition. The vents release excess pressure from the lower partition. The vents also guide air from the lower partition into the upper partition as water fills the pre-shaped lower partition. This increases the air pressure in the upper partition and enables the upper partition to become rigid to shape and support the lower partition. Air pressure also shapes the upper partition to inhibit water from splashing over the dike.

According to one aspect of the invention, the vents include pressure relief valves to regulate pressure within the lower partition. Accordingly, a desired pressure may be maintained in the lower partition to optimize partition shape. According to another aspect of the invention, the upper partition inlet includes a pressure relief valve for regulating pressure within the upper partition. Should the upper partition exceed a predetermined pressure, the relief valve would release air to prevent the upper partition from exploding, or leaking due to over-pressurization. The lower partition forms a triangular prism having a floor and two sides. The upper partition surrounds the two sides. Preferably, the upper partition includes at least two lobes designed to cause the lower partition to maintain the prism shape. The lobes cover each side of the lower partition according to one embodiment of the present invention. Other configurations, however, may be used. The lobes are both triangular prism shaped, and inverted with respect to the lower partition. Accordingly, inflation of each partition forms the portable dike and floatation device section into a square prism shape.

In accordance with one embodiment, a portable dike and floatation device having a lower partition; an upper partition attached to the lower partition; the lower partition forms a triangular prism having a floor and two sides; the upper partition has two lobes, the lobes cover the two sides, the lobes have a triangular prism shape, and wherein the inner and upper partition forms a square prism shape when the lower partition and the upper partition inflate; and at least one support member within the portable dike and floatation device.

In accordance with another embodiment, an inflatable dike and floatation device comprises: a plurality of portable dike and floatation devices, wherein each portable dike and floatation device comprising: a lower partition including a water inlet, the lower partition being water-fillable via the water inlet; an upper partition attached to the lower partition, the upper partition including an air inlet for inflating the upper partition; the lower partition forms a triangular prism having a floor and two sides; the upper partition has two lobes, the lobes cover the two sides, the lobes have a triangular prism shape, and wherein the inner and upper partition forms a square prism shape when the lower partition and the upper partition inflate; and at least one support member within the portable dike and floatation device; and a connector for connecting the plurality of portable dikes and floatation devices to one another.

In accordance with a further embodiment, a survival kit comprises: a plurality of portable dike and floatation devices, wherein each portable dike and floatation device comprises: a lower partition including a water inlet, the lower partition being water-fillable via the water inlet; an upper partition attached to the lower partition, the upper partition including an air inlet for inflating the upper partition; the lower partition forms a triangular prism having a floor and two sides; the upper partition has two lobes, the lobes cover the two sides, the lobes have a triangular prism shape, and wherein the inner and upper partition forms a square prism shape when the lower partition and the upper partition inflate; and at least one support member within each of the plurality of portable dike and floatation devices; at least one oar; and an inflation system for inflating the portable dike and floatation device with air.

In accordance with another embodiment, a method of use of a portable dike and floatation device comprising: providing one or more portable dike and floatation devices; forming a water diversion system using one or more portable dike and floatation devices by filling one or more of the portable dike and floatation devices with water; removing the water from at least one of the portable dike and floatation devices; and forming a floatation device by filling the at least one of the portable dike and floatation devices with air.

DETAILED DESCRIPTION

Figure 1:
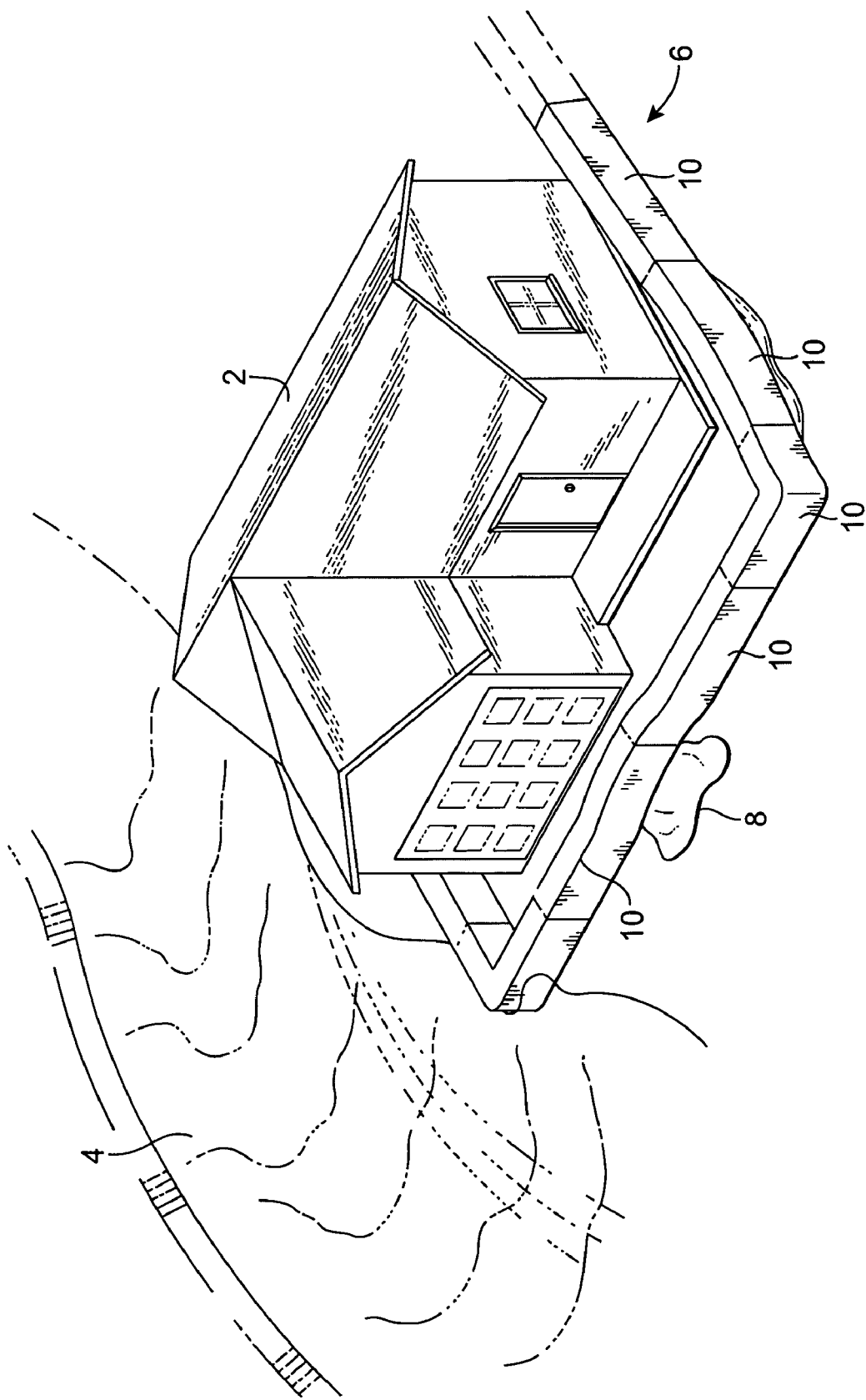
FIG. 1 shows a perspective view of a plurality of portable dike and floatation device by a house in accordance with one embodiment.

FIG. 1 shows a house 2, surface water 4, and an inflatable dike 6. The dike 6 is comprised of a plurality of interconnected portable dike and floatation devices 10. As shown in FIG. 1, in use the individual dike portable dike and floatation devices 10 can be aligned in an end-to-end formation forming a barrier or wall to protect homes and other structures. The dike 6 preferably surrounds much of the house 2 and blocks the surface water 4. In addition, each of the dike portable dike and floatation devices 10 is preferably flexible to accommodate ground irregularities such as the rocks 8.

Figure 2:
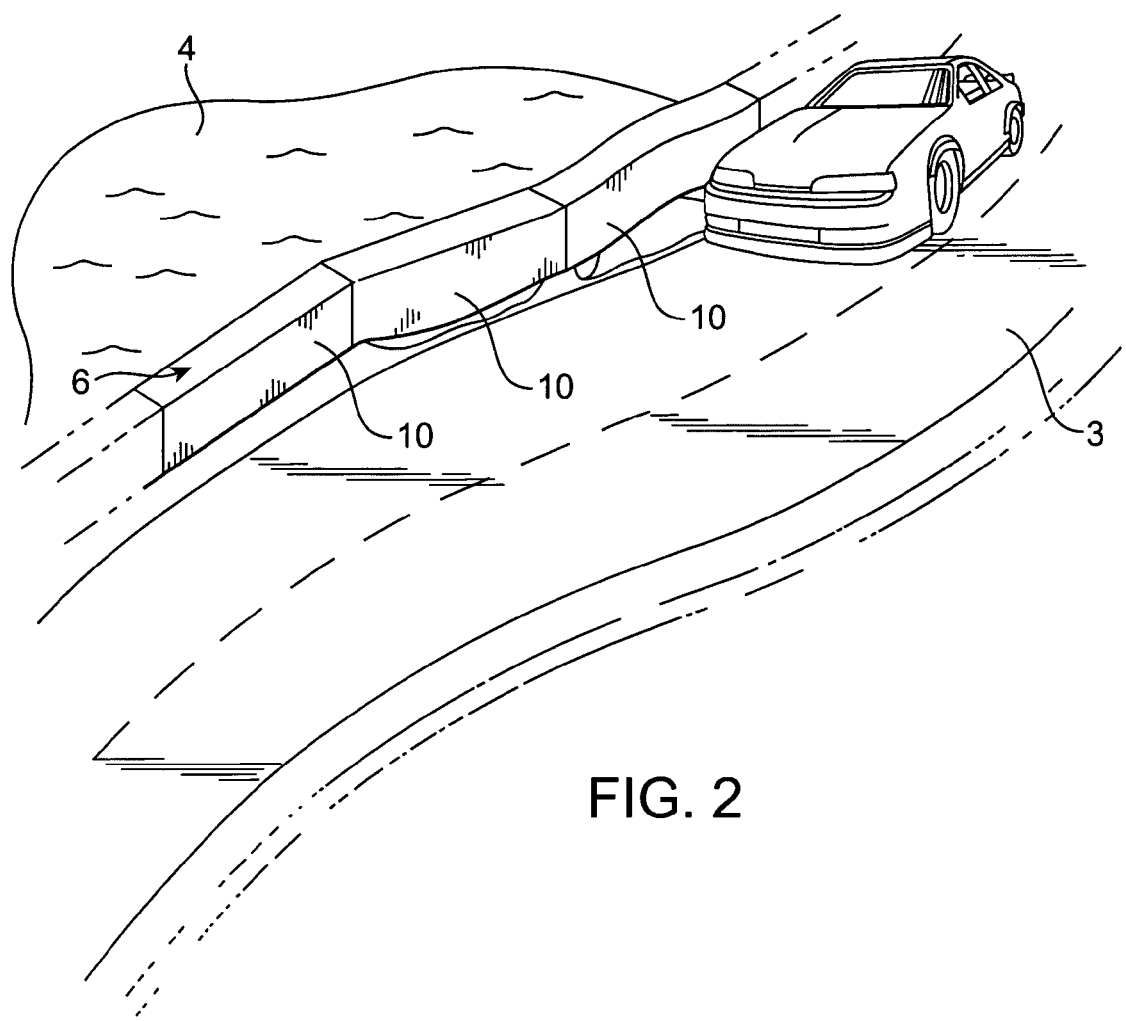
FIG. 2 shows a perspective view of the plurality of portable dike and floatation device of FIG. 1 by a roadside.

FIG. 2 shows a roadway 3 and the surface water 4 adjacent the roadway 3. The dike 6 stands between the surface water 4 and the roadway 3 and blocks the surface water 4 from flowing onto the roadway 3. As shown in FIG. 2, the dike 6 flexes and conforms to the roadway curvature.

Figure 3:
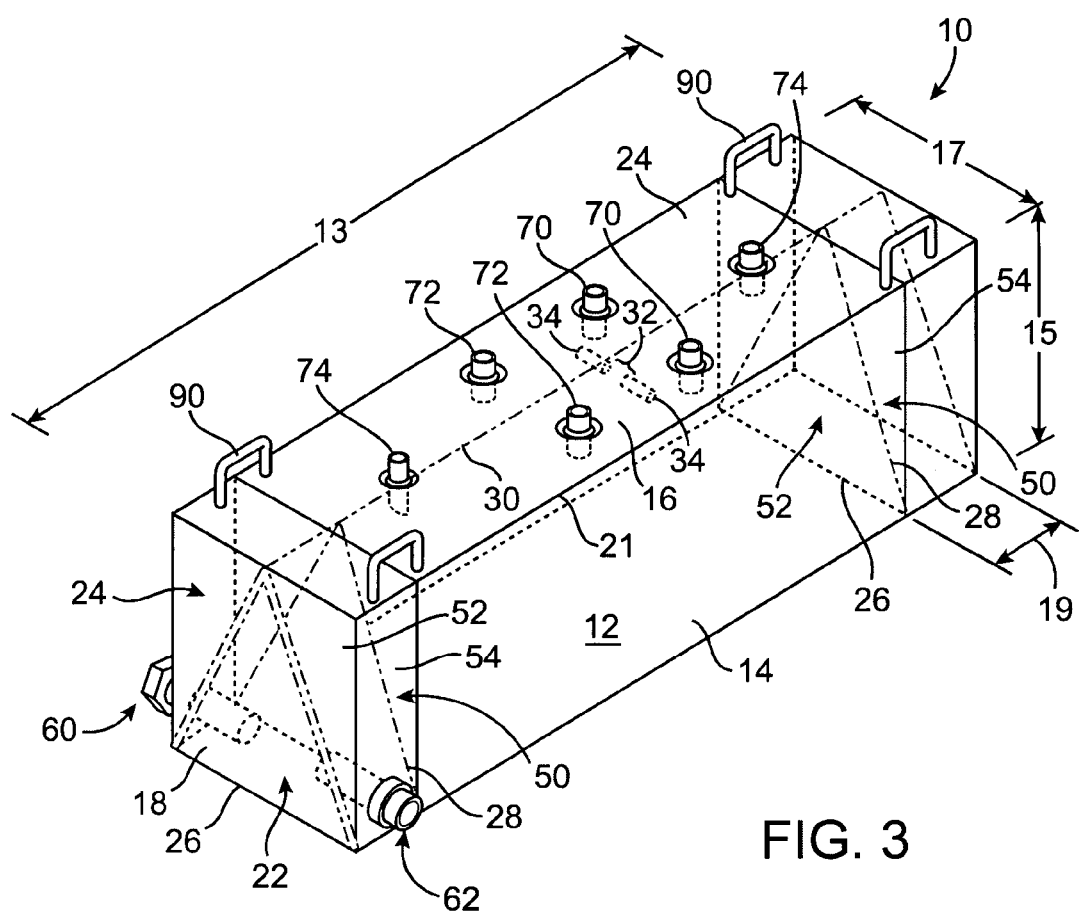
FIG. 3 shows an inflatable portable dike and floatation device in accordance with one embodiment.

FIG. 3 shows an inflatable portable dike and floatation device 10. As shown in FIG. 1, the portable dike and floatation device 10 has a base or lower surface 12, a pair of sides 14, a top or upper surface 16 and a pair of ends 18. As shown in FIG. 3, the portable dike and floatation device 10 has a generally rectangular cross section. However, it can be appreciated that the cross sectional configuration of the portable dike and floatation device 10 can be triangular or any other suitable configuration.

As shown in FIG. 3, the portable dike and floatation 10 from end to end 18 has an overall length 13 of preferably 2.0 to 10.0 feet, and more preferably 4.0 to 8.0 in length. The sides 14 from the base 12 to the upper surface or top 16 of the portable dike and floatation device 10 has a height 15 of preferably 0.5 to 2.0 feet and more preferably about 1.0 feet in height 15. The top surface 16 from edge 21 to edge 21 has a width 17 of preferably 0.5 to 2.0 feet and more preferably about 1.0 feet in width 17. The height 15 and the width 17 of the portable dike and floatation device 10 are preferably equal; however, it can be appreciated that the ratio of the height 15 to the width 17 can vary from 0.5 to 2.0.

Within the floatation device 10, as shown in FIG. 3, the portable dike and floatation device 10 has a lower partition 22 and an upper partition 24. The lower partition 22 and the upper partition 24 inflate. The lower partition 22 typically inflates with water to weight the portable dike and floatation device 10. Meanwhile, the upper partition 24 typically inflates with air to shape and support the portable dike and floatation device 10. Accordingly, the lower partition 22 typically weighs more than the upper partition 24.

It can be appreciated that using fluids including air and water to fill each portable dike and floatation device 10 not only shapes each portable dike and floatation device 10 to a desired degree, but also allows the portable dike and floatation device 10 to flex around curved roads and various non-uniform ground surfaces. While the lower partition 22 inflates with water, it may also be partially, or fully, inflated with another fluid such as air. Additionally, the lower partition 22 pre-inflates with air to ease interconnection between adjoining sections. While the upper partition 24 typically inflates with air, a combination of water and air may inflate the upper partition 24 to further weight the portable dike and floatation device 10.

The lower partition 22 has a nominally triangular cross-section and forms a right triangular prism having a floor 26 and a pair of sides 28. The lower partition 22 includes a water inlet 60 and a water outlet 62 each mounted on one side 14 of the portable dike and floatation device 10 and adjacent the floor 26. The water inlet 60 allows entry of water and air into the lower partition 22. Meanwhile, the water outlet 62 provides a drain for the removal or exiting of water from the lower partition 22.

The lower partition 22 includes a reinforced top edge 30 dividing the sides 28. The reinforced top edge 30 cooperates with the upper partition 24 to shape and reinforce the lower partition 22. According to one aspect of the invention, the reinforced top edge 30 is fabricated from steel cable.

The sides 28 can include optional air vents 32. The air vents 32 are defined adjacent the top edge 30. The upper partition 24 surrounds at least part of the lower partition 22 to shape and support the portable dike and floatation device 10 when the upper partition 24 inflates. The upper partition 24 has discrete lobes 36, 38 covering each side 28 of the lower partition 22. Each of the lobes 36, 36 has a triangular cross-section and forms a pair of right triangular prisms. The pair of triangular prisms of each lobe 36, 38 are formed from the upper surface or top 16 and a side 14 of the portable dike and floatation device 10, and a side 28 from the lower partition 22. The lobes 36, 38 maintain fluid communication with each other and with the lower partition 22 via the vents 32. The upper partition 24 includes an air inlet 70 for inflation of the upper partition 24 with air.

According to one aspect of the invention, the vents 32 include a pressure relief valves 34 to regulate lower partition 22 pressure. When the pressure within the lower partition 22 exceeds a desired level, air is released through the pressure relief valves 34 into the upper partition 24 to inflate the upper partition 24.

In use, the lower partition 22 fully inflates to a desired pressure prior to full inflation of the upper partition 24. Full inflation of the upper partition 24 occurs when the air pressure in the upper partition 24 meets a desired level, exceeding ambient air pressure. According to one aspect of the invention, the upper partition 24 has two lobes, 36, and 38, which are in fluid communication with each other. Each lobe 36, 38 fully covers one side 28 of the lower partition 22. It can be appreciated that while the lobes 36, 38 fully covering the sides 28 of the triangular prism shaped lower partition 22 are disclosed, the lobes 36, 38 may be of any shape suitable for shaping and supporting the lower partition 22. Numerous lobes may be used to cover portions of the sides, or may be internally mounted within the water-fillable lower partition 22.

Figure 7:
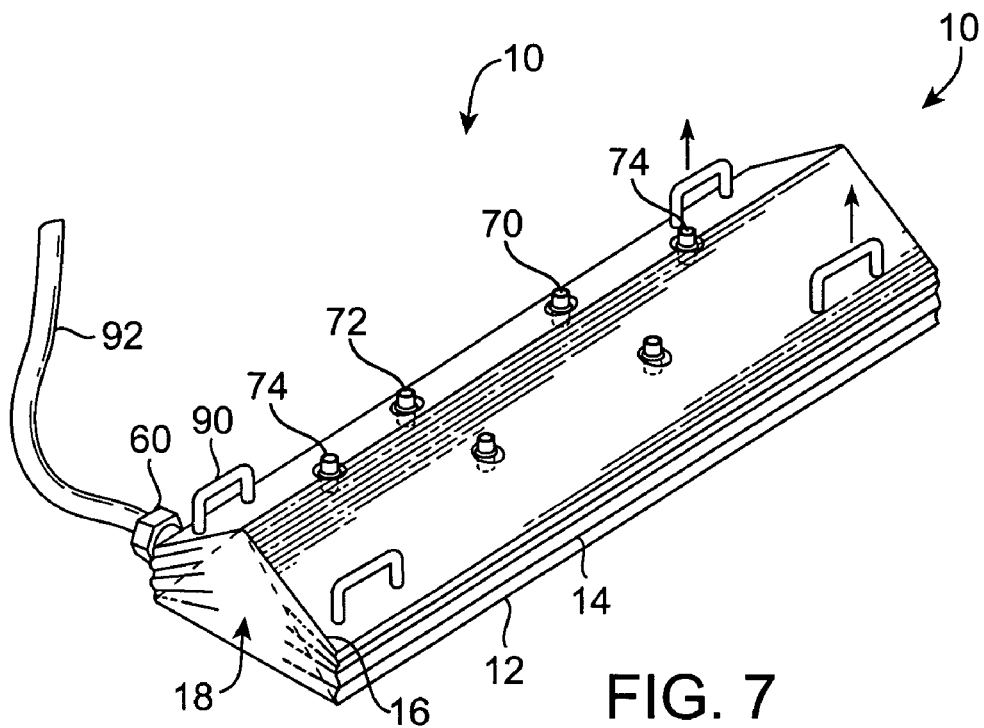
FIG. 7 shows a stage of inflating a portable dike and floatation device section in accordance with the present invention.
Figure 8:
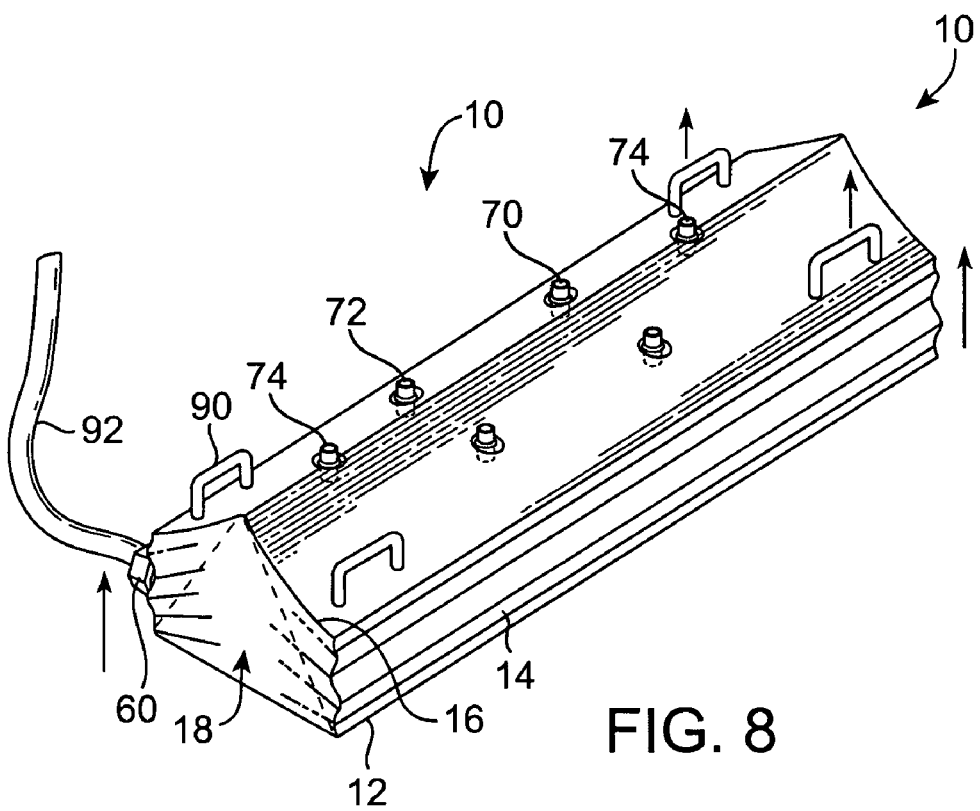
FIG. 8 shows another stage of inflating a portable dike and floatation device section in accordance with the present invention.

The upper partitions 14 can also includes a pressure relief valve 34 to bleed air out of the upper partition 24 at a desired pressure and thereby regulate pressure within the upper partition 24. Air is released so that the dike will not burst, or leak, from over-pressurization. The pressure relief valve 34 also assures that water flow into the dike will not be inhibited by over-pressurization. The pressure relief valve 34 is removable to enable air to fill each of the partitions 22, 24, when the handles 90 lift as shown in FIGS. 7 and 8.

It can be appreciated that the vents 32 can be constructed without the pressure relief valve 34. In this embodiment, the vents 32 are optional overflow passages. In use, when the lower partition 22 is filled, i.e. the water level reaches the vents 80, water spills through the vents into the upper partition 24. Water partially fills the upper partition 24 to add weight to the portable dike and floatation device 10. Weighting the upper partition 24 is desirable when the dike is used to stop flowing water, or water over a foot deep. Otherwise, it is normally most desirable to full the upper partition 24 only with air. It can be appreciated that air pressure within the portable dike and floatation device 10 increases continually as water is added.

In addition, as shown in FIG. 3, the portable dike and floatation device 10 can also include at least one support member 50, which is dimensioned to be received within the portable dike and floatation device 10. The support member 50 provides the portable dike and floatation device 10 with additional rigidity. In addition, the support member 50 provides addition rigidity and stability to upper surface 16 of the portable dike and floatation device 10 during use as a floatation device. Specifically, the support member 50 provides rigidity and additional support to the portable dike and floatation devices 10 on an outer edge 19 where the sides 14 intersect with the upper or top surface 16.

Figure 9:
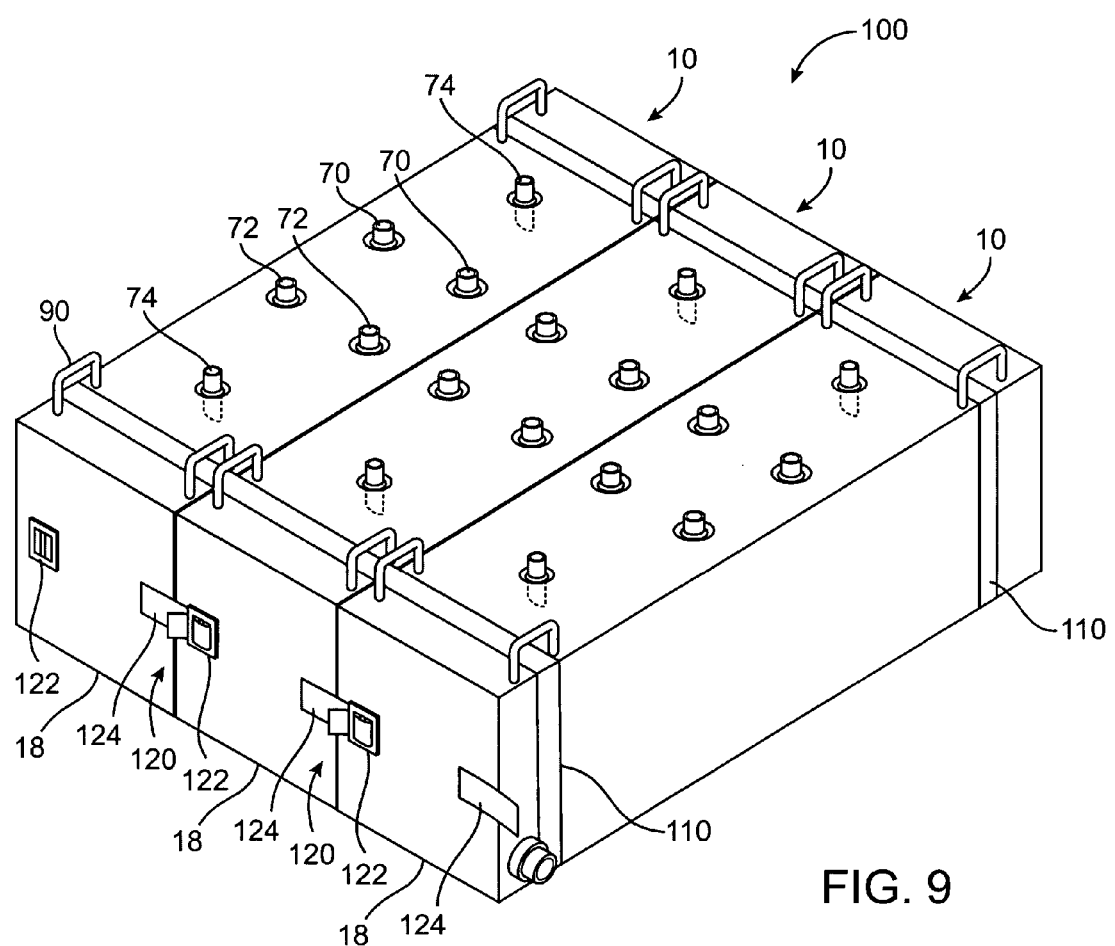
FIG. 9 shows a plurality of portable dike and floatation devices forming a floatation device or raft according to a further embodiment.

As shown in FIG. 3, the support member 50 is preferably positioned within the portable dike and floatation device 10 and is parallel to each end 18. However, it can be appreciated that the support member 50 can also extend from one end 18 to the other end 18 of the portable dike and floatation device 10. The support member 50 preferably extends from the floor 26 of the lower partition 22 to the upper surface or top 16 of the portable dike and floatation device 10. The support members 50 are preferably positioned near each end 18 of the portable dike and floatation device 10. The support member 50 provides the portable dike and floatation device with added support not only in use as a water diversion device but also as a floatation device or raft 100 (FIG. 9).

Each of the support members 50 are preferably positioned inward of the ends 18 of the portable dike and floatation device 10. The support member 50 is preferably spaced 19 at least two (2) to twelve (12) inches from each end 18 of the portable dike and floatation device 10 for a device having an overall length 13 of 4 to 6 feet. The space 19 between the end 18 of the portable dike and floatation device 10 and the support member 50 is preferably flexible or semi-flexible and can assist with forming a water tight seal when the portable dike and floatation devices 10 are connected in an end 18 to end 18 configuration or arrangement as shown in FIGS. 1 and 2.

Each portable dike and floatation device 10 has at least one support member 50 and more preferably at least two support members 50. It can be appreciated that the portable dike and floatation device 10 can have a plurality of support members 50, wherein the support members 50 are positioned equal distance from one another within each device 10 and having a spacing 19 from end 18 to support member 50, and support member 50 to support member 50 of at least 6 to 12 inches.

The support member 50 is preferably constructed of a semi-rigid material, or reinforced material such as nylon, pliable vinyl or other suitable material, which can provide the added rigidity and support to the portable dike and floatation device 10. It can be appreciated that the support member 50 can be constructed of any pliable material, wherein the material is pliable but provides added support and rigidity to the support member 50 during use as a water diversion device and as a floatation device or raft 100.

As shown in FIG. 3, on the top or upper surface 16 of the portable dike and floatation device 10, each of the lobes 36, 38 of the upper partition 24 includes an air inlet 70 for inflating the upper partitions 24 with air, and a pressure relief valve 72. The air inlets 70 are preferably configured to allow ambient air to fill the upper partitions 24 during set up of the portable dike and floatation device 10 and are able to accept a manual pump or gas cylinder (FIG. 11) for inflation as a floatation device. Overall, the air inlets 70 provide a means for inflating the portable dike and floatation device 10, while the pressure relief valves 72 regulate the air pressure within the lobes 36, 38 of each of the upper partition 24. In use, if the air pressure within either of the lobes 36, 38 of the upper partition 24 exceeds a desired air level, air is released through the pressure relief valves 72. The air inlets 70 are preferably equipped with a threaded connector or quick connect topping valve. However, it can be appreciated that any suitable connector can be used for the air inlet 70.

The top or upper surface 16 of the portable dike and floatation device 10 can also include at least one pressure relief valve 74, which is in communication with the lower partition 22 of the portable dike and floatation device 10. The at least one pressure relief valve 74 is optional and can be implemented instead of the vent 32 and pressure relief valve 34 or as an additional pressure regulator within the lower partition.

As shown in FIG. 3, the pressure relief valve 74 regulates the air and/or water pressure within the lower partition. Accordingly, if the air pressure within the lower partition 22 exceeds a desired air or water pressure, air can be released from the lower partition 22 via the pressure relief valve 74.

Each of the air inlets 70, and pressure relief valves 72, 74 are preferably recessed and/or have a means to be recessed when not in use. The recessing of the air inlet 70, and pressure relief valves 72, 74, provides the portable dike and floatation device 10 with a smooth or planar surface for use as a floatation device. In addition, each of the air inlets 70 and pressure relief valves 72, 74 can be optionally fitted with a screw cap (not shown) which fits on top of the air inlet 70 and pressure relief valves 72, 74 and provides a smooth upper surface or top surface 16 of the portable dike and floatation device 10 during use as a raft or floatation device 100.

The portable dike and floatation device 10 also includes a plurality of handle 90, which are configured to assist with the handling and positioning of the portable dike and floatation device 10 both as a device to redirect water and as a floatation device. As shown in FIG. 3, each of the handles 90 is preferably secured or attached to the upper surface 16 of the portable dike and floatation device 10. The handles 90 are preferably made of a lightweight material such as a plastic. However, the handles 90 can be constructed of any suitable lightweight material.

It can be appreciated that the portable dike and floatation devices 10 can be attached to one another in an end-to-end 18 relationship to form a portable dike 6 by any suitable method. For example, the portable dike and floatation devices 10 can be cabled together with short cables, Velcro® straps and buckles or other suitable method. The ends 18 of the portable dike and floatation devices 10 are preferably connected in an end-to-end 18 relationship in a watertight manner so that the portable dike and floatation devices 10 can divert water as necessary.

The portable dike and flotation device 10 can be constructed from a variety of different materials. For example, the device 10 may be made from a water permeable material, such as a mesh or similar material, or a water impermeable material such as nylon, a pliable watertight fabric or heavy-duty vinyl can be used for the portable dike and floatation device 10.

Figure 4:
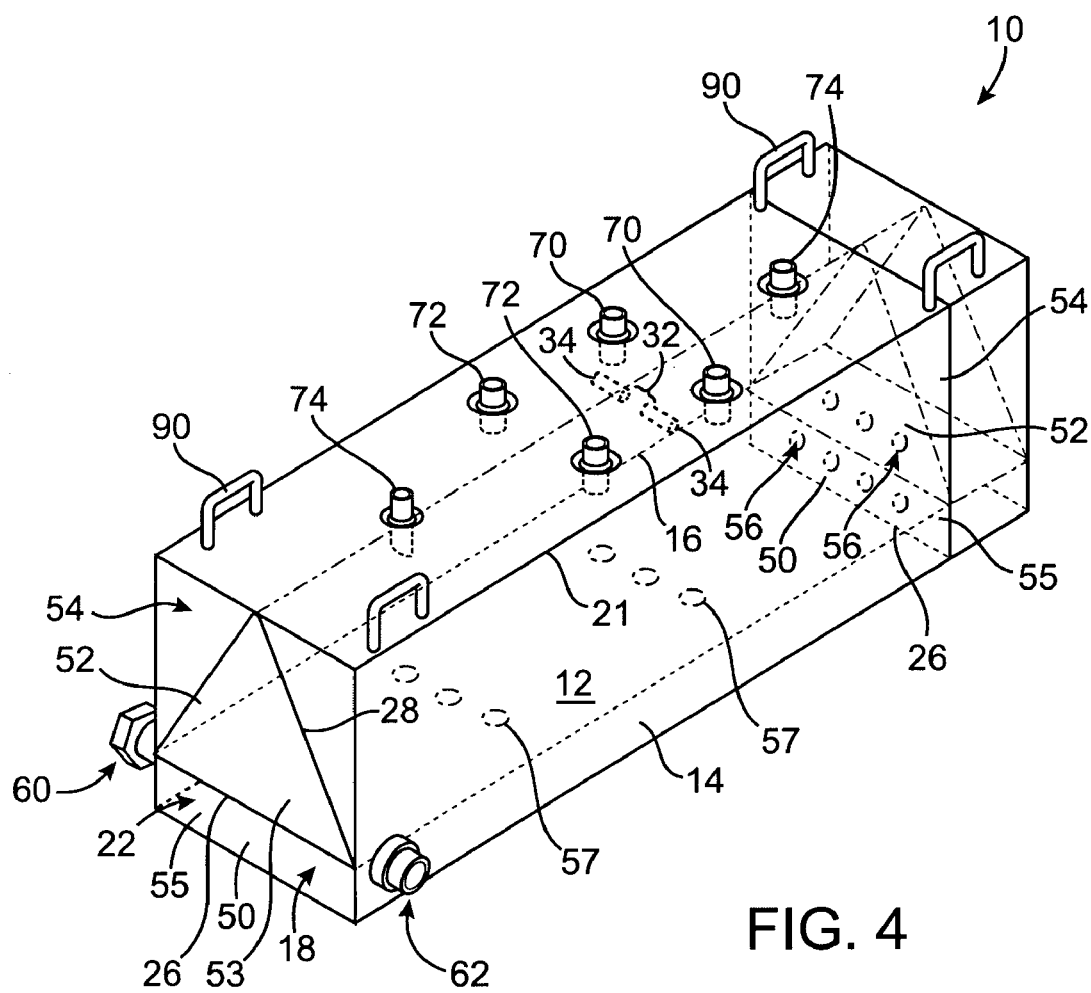
FIG. 4 shows an inflatable portable dike and floatation device in accordance with another embodiment.

FIG. 4 shows a portable dike and floatation device 10 in accordance with another embodiment. As shown in FIG. 4, the portable dike and floatation device 10 has a lower partition 22 and an upper partition 24. The lower partition 22 typically inflates with water to weight the portable dike and floatation device 10. Meanwhile, the upper partition 24 typically inflates with air to shape and support the portable dike and floatation device 10. Accordingly, the lower partition 22 typically weighs more than the upper partition 24.

It can be appreciated that using fluids including air and water to fill each portable dike and floatation device 10 not only shapes each portable dike and floatation device 10 to a desired degree, but also allows the portable dike and floatation device 10 to flex around curved roads and various non-uniform ground surfaces. While the lower partition 22 inflates with water, it may also be partially, or fully, inflated with another fluid such as air. Additionally, the lower partition 22 pre-inflates with air to ease interconnection between adjoining sections. While the upper partition 24 typically inflates with air, a combination of water and air may inflate the upper partition 24 to further weight the portable dike and floatation device 10.

The lower partition 22 has a nominally triangular cross-section and forms a right triangular prism having a floor 26 and a pair of sides 28. The lower partition 22 includes a water inlet 60 and a water outlet 62 each mounted on one side 14 of the portable dike and floatation device 10 and adjacent the floor 26. The water inlet 60 allows entry of water and air into the lower partition 22. Meanwhile, the water outlet 62 provides a drain for the removal or exiting of water from the lower partition 22. As shown in FIG. 4, the floor 26 of the lower partition 22 can included a plurality of floor openings or holes 57 to allow water to fill the lower partition 22. The openings or holes 57 within the floor 26 of the lower partition 22 are preferably equally spaced from end 18 to end 18 of the portable dike and floatation device 10. As shown in FIG. 4, the portable dike and floatation device 10 preferably has at least two (2) rows of three (3) openings 57 along the floor 26 of the lower partition 22. It can be appreciated that the openings 57 within the floor 26 of the lower partition 22 can be located or positioned anywhere on the floor 26 including between the support member 50 and the nearest end 18.

The lower partition 22 can also include a reinforced top edge 30, which divides the sides 28. The reinforced top edge 30 cooperates with the upper partition 24 to shape and reinforce the lower partition 22. According to one aspect of the invention, the reinforced top edge 30 is fabricated from steel cable. The sides 28 include air vents 32. The air vents 32 are defined adjacent the top edge 30. The upper partition 24 surrounds at least part of the lower partition 22 to shape and support the portable dike and floatation device 10 when the upper partition 24 inflates. The upper partition 24 has discrete lobes 36, 38 covering each side 28 of the lower partition 22. The lobes 36, 38 maintain fluid communication with each other and with the lower partition 22 via the vents 32. The upper partition 24 includes an air inlet 70 for inflation the upper partition 24 with air.

According to one aspect of the invention, the vents 32 include pressure relief valves 34 to regulate lower partition 22 pressure. When the pressure within the lower partition 22 exceeds a desired level, air is released through the pressure relief valves 34 into the upper partition 24 to inflate the upper partition 24. Accordingly, the lower partition 22 fully inflates to a desired pressure prior to full inflation of the upper partition 24. Full inflation of the upper partition 24 occurs when the air pressure in the upper partition 24 meets a desired level, exceeding ambient air pressure.

The upper partitions 14 can also includes a pressure relief valve 34 to bleed air out of the upper partition 24 at a desired pressure and thereby regulate pressure within the upper partition 24. Air is released so that the dike will not burst, or leak, from over-pressurization. The pressure relief valve 34 also assures that water flow into the dike will not be inhibited by over-pressurization.

In addition, as shown in FIG. 4, the portable dike and floatation device 10 can also include at least one support member 50, wherein a first support member 50 is positioned on the end 18 of the portable dike and floatation device 10 and a second support member 50 is positioned near the ends 18 of the portable dike and floatation device 10. As shown in FIG. 4, the second support member 50 is preferably positioned towards the center of the portable dike and floatation device 10 and is preferably spaced 19 at least 2.0 to 12.0 inches from only one end 18 of the portable dike and floatation device 10. As shown in FIG. 4, the portable dike and floatation device 10 includes one end 18 having a support member 50 at the end 18 of the device 10 and a second end 18 having the support member 50 nearer the center of the device 10. This arrangement allows for one end 18 of the device 10 to have an additional flexibility and maneuverability to fit tightly against another portable dike and floatation device 10 creating a water-tight seal between devices 10 and also to adjust to uneven or irregular shaped rocks and other objects, which cannot be moved during set up of the portable dike and floatation device 10 as a water diversion system.

Figure 5:
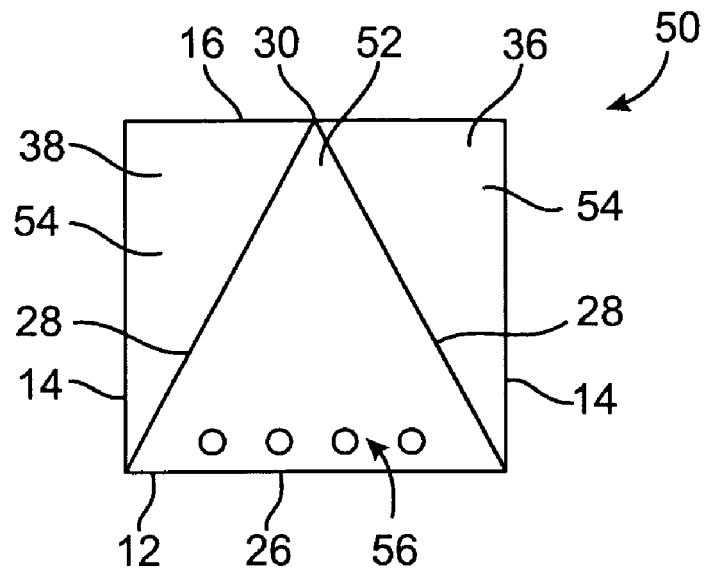
FIG. 5 shows a support member of an inflatable portable dike and floatation device in accordance with the embodiment as shown in FIG. 3.

FIG. 5 shows a support member 50 according to one embodiment and as shown in FIG. 3. As shown in FIG. 5, each of the support members 50 is comprises of a reinforced material, which provides the portable dike and floatation device 10 with additional support as a water diversion device and as a floatation device. The support member 50 provides the portable dike and floatation device with added support not only in use as a water diversion device but also as a floatation device or raft 100 (FIG. 9). The support member 50 is preferably comprised of a rectangular member having a lower partition 52 corresponding to the lower partition 22 of the portable dike and floatation device 10, and an upper partition 54 corresponding to the upper partition 24 of the portable dike and floatation device 10.

As shown in FIG. 5, the lower partition 52 includes at least one opening 56 dimensioned to allow the flow of water within the lower partition 22 of the portable dike and floatation device 10. The at least one opening 56 is preferably at least 2 opening and more preferably 2 to 6 openings of any suitable shape. In addition, the upper partitions 54 also preferably include at least one opening 58 dimensioned to allow air from the upper partition 24 to flow within the upper partition 24 of the portable dike and floatation device 10. As shown in FIG. 5, the support member 50 is preferably constructed of a single material, which is configured to provide support to the portable dike and floatation device 10.

Figure 6:
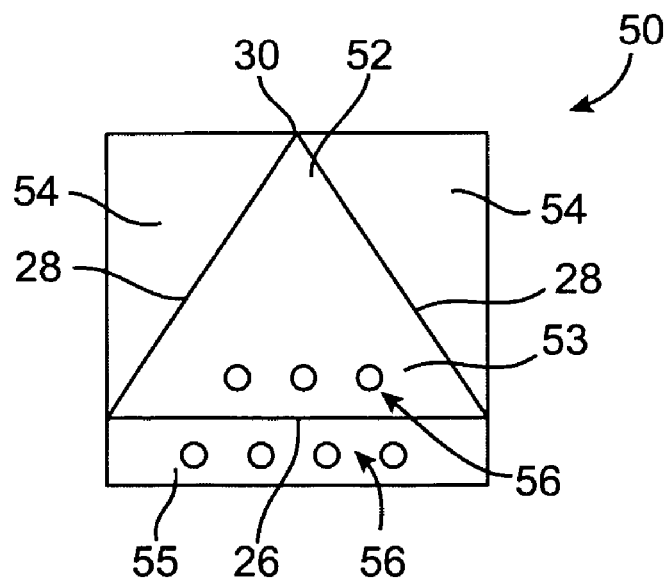
FIG. 6 shows a support member of an inflatable portable dike and floatation device in accordance with the embodiment as shown in FIG. 4.

FIG. 6 shows a support member 50 according to another embodiment as shown in FIG. 4. As shown in FIG. 6, the support members 50 is comprises of a reinforced material, which provides the portable dike and floatation device 10 with additional support as a water diversion device and as a floatation device. The support member 50 is preferably comprised of a rectangular member having a lower partition 52 corresponding to the lower partition 22 of the portable dike and floatation device 10, and an upper partition 54 corresponding to the upper partition 24 of the portable dike and floatation device 10.

As shown in FIG. 6, the lower partition 52 is comprised of an upper section 53 and a lower section 55. The upper section 53 and the lower section 55 are preferably constructed such that the upper section 53 is more flexible than the lower section 55. However, it can be appreciated the upper section 53 can be more flexible than the lower section 55. The upper and lower sections 53, 55 also include at least one opening 56 dimensioned to allow the flow of water within the lower partition 22 of the portable dike and floatation device 10. The at least one opening 56 is preferably at least two (2) opening and more preferably two (2) to six (6) openings 56 of any suitable shape. It can be appreciated that in an alternative embodiment, the support member 50 can be include only an upper section 53 as shown in FIG. 6, and wherein the lower section 55 is single opening 56 having a generally rectangular cross section.

The support member 50 is preferably constructed of a single material, which is configured to provide support to the portable dike and floatation device 10. Any suitable material can be used including nylon, heavy-duty vinyl, or other suitable material, which can handle the wet conditions.

FIG. 7 shows the portable dike and floatation device 10 in a nearly deflated configuration. As shown in FIG. 7, the portable dike and floatation device 10 includes a plurality of handles 90 for lifting the upper partition 24. In use, the lifting of the handles 90 forces ambient air into the air inlet 70 to pre-inflate the upper partition 24.

In addition, as shown in FIG. 7, a hose 92 attaches to the water inlet 60 and delivers water directly to the lower partition 22. As water enters the lower partition 22, an increase in the air pressure in the lower partition 22 occurs. Some air escapes from the lower partition 22 via the vents 32 (FIGS. 3 and 4) to increase air pressure in the upper partition 24. Accordingly, the air pressure in the both partition of the portable dike and floatation device 10 increases when water enters the lower partition 22. In use, the increased air pressure supports and shapes the portable dike and floatation device 10. Increased air pressure enables the upper partition 24 to achieve a degree of rigidity to keep water from splashing over the portable dike and floatation device 10.

FIG. 8 shows the handles 90 lifting the portable dike and floatation device 10 into a partially inflated configuration. When the handles 90 lift, the upper partition 24 and lower partition 22 expand. Ambient air enters the air inlet 70, filling the expanded upper partition 24. In addition, air from the upper partition 24 flows through the vents 32 to fill the lower partition 22. The lifting of the handles 90, thus, pre-shapes the portable dike and floatation device 10 by pre-inflating the upper and lower partitions 22, 24 with air at ambient pressure.

FIG. 9 shows a plurality of portable dike and floatation devices 10 forming a floatation device 100 according to a further embodiment. As shown in FIG. 9, the plurality of portable dike and floatation devices 10 can be attached to one another in a side-by-side configuration forming a floatation device 100. It can be appreciated that the individual portable dike and floatation devices 10 can be attached or fixed to one another in any suitable manner including but not limited to nylon straps, buckles, clasps, and hooks. For example, as shown in FIG. 9, a pair of straps 110 is dimensioned to fit through the handles 90 of each of the individual portable dike and floatation devices 10 and underneath the lower portion or base 12 of the portable dike and floatation device 10.

As shown in FIG. 9, each of the portable dike and floatation devices 10 can include a connector 120 comprised of a strap 124 and a buckle 122. Alternatively, the connector 120 can be a hook-and-loop system also known as VELCRO®, laces, buckles, snaps, or other suitable fasteners well known in the art could be used to secure the portable dike and floatation device 10 to one another.

Figure 10:
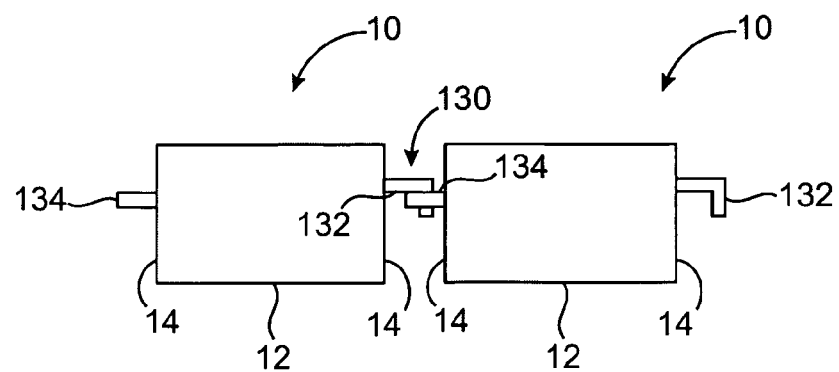
FIG. 10 shows a cross sectional view of a pair of portable dikes and flotation devices having a means for connecting the sides of each to one another.

FIG. 10 shows a pair of inflatable portable dike and floatation devices 10 having a connector for attaching a plurality of inflatable portable dikes to form a floatation device. As shown in FIG. 10, the connector 130 is comprised of a hook 132 and loop 134. The loop 134 is dimensioned to receive the hook 132 and secure the portable dike and floatation devices 10 in a side-by-side relationship. It can be appreciated that the hook 132 and loop 134 can be made of any suitable material but is preferably a plastic like material or other suitable material, which can withstand the wet conditions that the portable dike and floatation device will experience.

Figure 11:
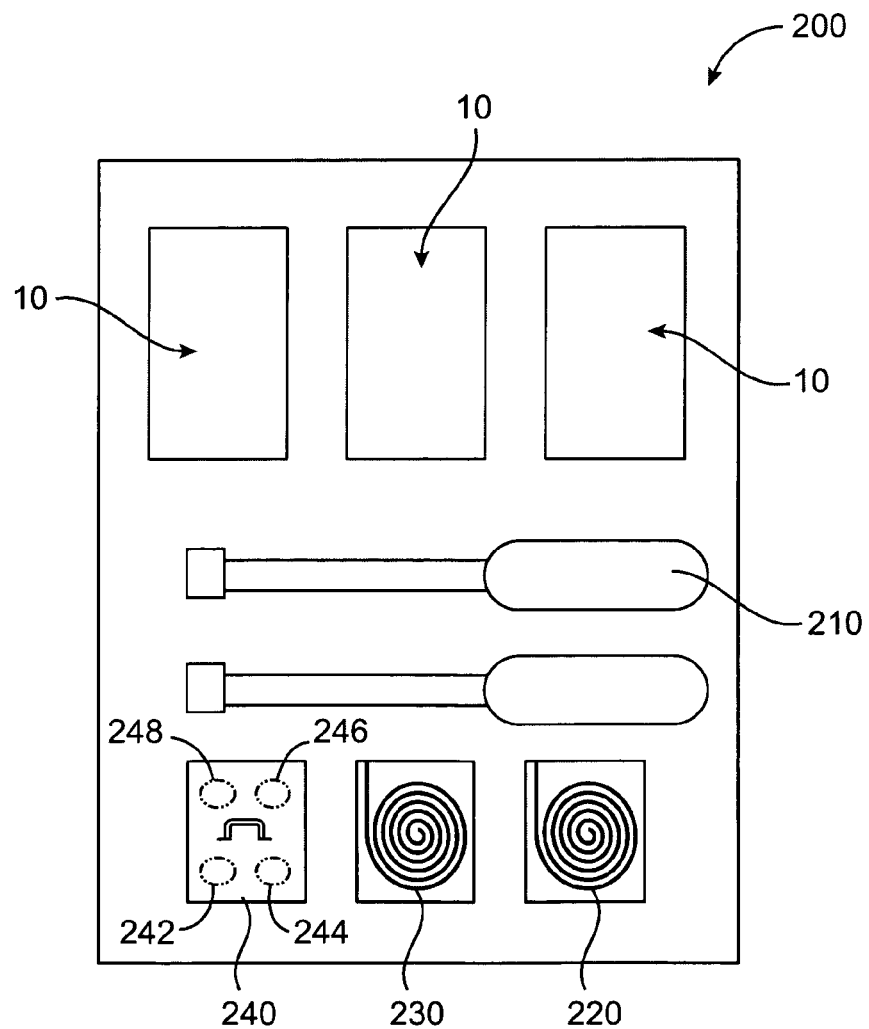
FIG. 11 shows a survival kit having a plurality of portable dikes and floatation devices, a pair of oars, a water hose, an air hose and an inflation system for inflating the individual portable dike and floatation devices.

FIG. 11 shows a survival kit 200 having a plurality of portable dike and floatation devices 10, at least one oar 210 and more preferably at least two oars, a water hose 220 dimensioned to fill each of the portable dike and floatation devices 10 with water, an air hose 230 dimensioned to fill the portable dike and floatation devices 10 with air, and a survival box 240. The survival box 240 can include a plurality of survival materials including food and water 242, an inflation system 244 in the form of a manual air or hand pump, and/or a gas cylinder to inflate each of the portable dike and floatation devices 10, a plurality of straps and/or materials 246 for connecting the portable dike and floatation devices 10 to one another, and a flashlight 248. It can be appreciated that the food and water 242 can further include a bottle of Tarantula® tequila.

It should be appreciated that if the portable dike and floatation devices 10 are used as a raft and/or floatation device 100, a manual air pump is preferable. While the raft or floatation device 100 can be inflated with a gas cylinder, things do go wrong on occasion, and more often though, a hand pump is necessary to manually top up the raft or floatation device 100 due to slow leaks and/or the temperature differential between night and day, for reinflating one of the portable dike and floatation devices 10 after a puncture, or manually inflating the raft or floatation device 100.

As described herein, the portable dike and floatation devices 10 can be used as a water diversion system and be removing or releasing the water from the lower partition 22 and filing the lower partition 22 with air, the portable dike and floatation devices 10 can be used as a floatation device and/or raft 100. In use, the portable dike and floatation devices 10 can comprise the steps of providing one or more portable dike and floatation devices 10, each portable dike and floatation device 10 having a lower partition 22 and an upper partition 24. A water diversion system or dike 6 can be formed by using one or more portable dike and floatation devices 10 and filling one or more of the lower partitions 22 of the portable dike and floatation devices 10 with water. In addition, it is preferable that when forming a water diversion device, the upper partitions 24 of the portable dike and floatation devices 10 are filled with air. However, upon an emergency or other situation wherein the portable dike and floatation device 10 is no longer needed as a water diversion system or dike 6, the portable dike and floatation devices 10 can be used as a floatation device 10.

In order to use the portable dike and floatation device 10 as a floatation device or raft 100, the water is removed from the lower partitions 22 of at least one of the portable dike and floatation devices 10. The water is removed from the portable dike and floatation device 10 via the water outlet 62. The water can be removed in any suitable manner include by gravity, suction via a pump or other system including pumping air via a manual or hand pump, and/or gas cylinder into the lower partition 22 through the water inlet 60. Once the water or the majority of the water has been removed from the lower partition 22, the lower partition 22 of the at least one portable dike and floatation devices 10 is filled with air and forms a floatation device or raft 100. It can be appreciated that the floatation device or raft 100 can also be formed by combining at least two portable dike and floatation devices 10.

Additionally, the embodiments of the portable dike and flotation device 10 as shown in the figures, multiple features could be added to these portable dike and flotation devices 10 according to a user's need, market demand, design specifications, or the like. Moreover, additional convenient features can be readily added to the flotation devices described above. For example, a fastening means could be provided to attach the portable dike and flotation device of the present invention to one another or a boat, or other vehicle.

Furthermore, it will be appreciated that the choice of materials and size and shape of the various elements of the invention could be varied according to particular design specifications or constraints requiring a portable dike and flotation device according to the invention.

It will be understood that the foregoing description is of the preferred embodiments, and is, therefore, merely representative of the article and methods of manufacturing the same. It can be appreciated that variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A portable dike and floatation device comprising:
   a lower partition;
   an upper partition attached to the lower partition;
   the lower partition forms a triangular prism having a floor and two sides;
   the upper partition has two lobes, the lobes cover the two sides, the lobes have a triangular prism shape, and wherein the lower and upper partitions form a square prism shape when the lower partition and the upper partition inflate; and
   at least one support member within the portable dike and floatation device, which is dimensioned to be received within the device to provide rigidity and stability to an upper surface of the device during use as a floatation device, and wherein the support member is comprised of a rectangular member having a lower partition support member corresponding to the lower partition of the portable dike and floatation device, and an upper partition support member corresponding to the upper partition of the portable dike and floatation device.

2. The device of claim 1, wherein the lower partition includes a water inlet, the lower partition being water-fillable via the water inlet, and the upper partition includes an air inlet for inflating the upper partition.

3. The device of claim 1, wherein the at least one support member extends from the floor of the lower partition to an upper surface of the two lobes, and wherein the at least one support member is parallel to each end of the portable dike and floatation device.

4. The device of claim 3, wherein the at least one support member comprises a plurality of support members, which are positioned an equal distance from one another within the device and having a spacing from one end of the device to the other end of the device of at least 6 to 12 inches.

5. The device of claim 1, further comprising a connector for connecting two or more portable dike and floatation devices to one another to form a floatation device.

6. The device of claim 1, wherein the lower partition has vents in fluid communication with the upper partition, the vents guide air from the lower partition into the upper partition as water fills the pre-inflated lower partition, and wherein the vents include pressure relief valves to regulate pressure within the lower partition.

7. The device of claim 1, wherein the upper partition further includes a pressure relief valve for regulating pressure within the upper partition.

8. The device of claim 1, further comprising a rectangular lower section, which is in fluid communication with the lower partition, the lower partition comprising an upper section, which forms a triangular prism having a floor and two sides, and wherein the floor forms an upper surface of the lower rectangular section.

9. The device of claim 1, wherein the lower partition support member includes at least one opening dimensioned to allow the flow of water within the lower partition of the portable dike and floatation device, and wherein the upper partition support member also include at least one opening dimensioned to allow air from the upper partition to flow within the upper partition of the portable dike and floatation device.

10. An inflatable dike and floatation device comprising:
    a plurality of portable dike and floatation devices, wherein each portable dike and floatation device comprises:

a lower partition including a water inlet, the lower partition being water-fillable via the water inlet;

an upper partition attached to the lower partition, the upper partition including an air inlet for inflating the upper partition;

the lower partition forms a triangular prism having a floor and two sides;

the upper partition has two lobes, the lobes cover the two sides, the lobes have a triangular prism shape, and wherein the lower and upper partition form a square prism shape when the lower partition and the upper partition inflate; and at least one support member within the portable dike and floatation device, which is dimensioned to be received within the device to provide rigidity and stability to an upper surface of the device during use as a floatation device, and wherein the at least one member extends from the floor of the lower partition to an upper surface of the two lobes, and wherein the at least one support member is parallel to each end of the portable dike and floatation device, and wherein the at least one support member comprises a plurality of support members, which are positioned an equal distance from one another within the device and having a spacing from one end of the device to the other end of the device of at least 6 to 12 inches; and a connector for connecting the plurality of portable dikes and floatation devices to one another.

11. The device of claim 10, wherein the lower partition has vents in fluid communication with the upper partition, the vents guide air from the lower partition into the upper partition as water fills the pre-inflated lower partition, and wherein the vents include pressure relief valves to regulate pressure within the lower partition.

12. The device of claim 10, wherein the upper partition inlet includes a pressure relief valve for regulating pressure within the upper partition.

13. A survival kit comprising:

a plurality of portable dike and floatation devices, wherein each portable dike and floatation device comprises:

a lower partition including a water inlet, the lower partition being water-fillable via the water inlet;

an upper partition attached to the lower partition, the upper partition including an air inlet for inflating the upper partition;

the lower partition forms a triangular prism having a floor and two sides;

the upper partition has two lobes, the lobes cover the two sides, the lobes have a triangular prism shape, and wherein the lower and upper partition form a square prism shape when the lower partition and the upper partition inflate;

at least one support member within each of the plurality of portable dike and floatation devices, which is dimensioned to be received within the plurality of devices to provide rigidity and stability to an upper surface of the devices during use as a floatation device; and a rectangular lower section, which is in fluid communication with the lower partition, the lower partition comprising an upper section, which forms a triangular prism having a floor and two sides, and wherein the floor forms an upper surface of the lower rectangular section;

at least one oar; and an inflation system for inflating the portable dike and floatation device with air.

14. The kit of claim 13, further comprising a connector for connecting the plurality of portable dike and floatation devices to one another.

15. The kit of claim 13, further comprising a water hose dimensioned to fill at least the lower partition with water.

16. The kit of claim 13, further comprising an air hose dimensioned to fill at least the upper partitions with air.

17. The kit of claim 13, further comprising a survival box having a supply of food and water, a plurality of straps for connecting the portable dike and floatation devices to one another, an inflation system in the form of a manual air pump to inflate each of the portable dike and floatation devices, and wherein the inflation system is in the form of a manual air pump to inflate each of the portable dike and floatation devices.

18. A portable dike and floatation device comprising:

a lower partition;

an upper partition attached to the lower partition;

the lower partition forms a triangular prism having a floor and two sides;

the upper partition has two lobes, the lobes cover the two sides, the lobes have a triangular prism shape, and wherein the lower and upper partitions form a square prism shape when the lower partition and the upper partition inflate;

at least one support member within the portable dike and floatation device, which is dimensioned to be received within the device to provide rigidity and stability to an upper surface of the device during use as a floatation device, and a rectangular lower section, which is in fluid communication with the lower partition, the lower partition comprising an upper section, which forms an triangular prism having a floor and two sides, and wherein the floor forms an upper surface of the lower rectangular section.

19. The device of claim 18, wherein the lower partition includes a water inlet, the lower partition being water-fillable via the water inlet, and the upper partition includes an air inlet for inflating the upper partition.

20. The device of claim 18, wherein the at least one support member extends from the floor of the lower partition to an upper surface of the two lobes, and wherein the at least one support member is parallel to each end of the portable dike and floatation device.

21. The device of claim 18, wherein the lower partition has vents in fluid communication with the upper partition, the vents guide air from the lower partition into the upper partition as water fills the pre-inflated lower partition, and wherein the vents include pressure relief valves to regulate pressure within the lower partition.

22. A portable dike and floatation device comprising:

a lower partition including a water inlet, the lower partition being water-fillable via the water inlet;

an upper partition attached to the lower partition, the upper partition including an air inlet for inflating the upper partition;

the lower partition forms a triangular prism having a floor and two sides;

the upper partition has two lobes, the lobes cover the two sides, the lobes have a triangular prism shape, and wherein the lower and upper partitions form a square prism shape when the lower partition and the upper partition inflate; and at least one support member within the portable dike and floatation device, which is dimensioned to be received within the device to provide rigidity and stability to an upper surface of the device during use as a floatation device, wherein the at least one support member extends from the floor of the lower partition to an upper surface of the two lobes, and wherein the at least one support member is parallel to each end of the portable dike and floatation device, and wherein the at least one support member comprises a plurality of support members, which are positioned an equal distance from one another within the device and having a spacing from one end of the device to the other end of the device of at least 6 to 12 inches.

* * * * *